United States Patent [19]

Ueyama

[11] Patent Number: 4,480,484

[45] Date of Patent: Nov. 6, 1984

[54] FLOW RATE DETECTION DEVICE

[75] Inventor: Yoshiji Ueyama, Kobe, Japan

[73] Assignee: Mitsubishi Denki Kabushiki Kaisha, Tokyo, Japan

[21] Appl. No.: 451,202

[22] PCT Filed: Apr. 8, 1982

[86] PCT No.: PCT/JP82/00112

§ 371 Date: Dec. 6, 1982

§ 102(e) Date: Dec. 6, 1982

[87] PCT Pub. No.: WO83/03668

PCT Pub. Date: Oct. 27, 1983

[51] Int. Cl.³ ............................................. G01F 1/56
[52] U.S. Cl. ................................. 73/861.08; 324/453
[58] Field of Search ..................... 73/861.08, 861.09; 324/453; 417/48; 361/285

[56] References Cited

U.S. PATENT DOCUMENTS

| | | | |
|---|---|---|---|
| 3,255,629 | 6/1966 | Brunton | 73/861.08 |
| 4,041,376 | 8/1977 | Furuto et al. | 73/861.09 |
| 4,223,241 | 9/1980 | Paszyc et al. | 310/309 X |
| 4,305,301 | 12/1981 | Evans et al. | 73/861.09 |

FOREIGN PATENT DOCUMENTS 315933 12/1971 U.S.S.R. ........................... 73/861.09

OTHER PUBLICATIONS

W. G. Wolber, "Automotive Engine Control Sensors 80", 800121, Society of Automotive Engineers Inc. 1980, pp. 63–77.
L. A. Rehn et al., "Dual-Element, Solid State Fluid Flow Sensor", 800128, Society of Automotive Engineers Inc. 1980, pp. 101–106.
W. Baatz, "Automotive Turbine Fuel Flow Transducer", 760021, Society of Automotive Engineers Inc. 1976, pp. 31–36.

Primary Examiner—Charles A. Ruehl
Attorney, Agent, or Firm—Wenderoth, Lind & Ponack

[57] ABSTRACT

A flow rate detection device is constructed so that electrodes for forming an electric field whose intensity spatially changes along a stream of a dielectric fluid are coaxially arranged, and a current detecting means measures a dielectric polarization current flowing when the dielectric fluid flows between the electrodes which form the electric field. The device can detect even a flow rate having a large change therein, for example, of an intermittently flowing stream, and is suitable as a device for measuring a flow rate of a fuel.

3 Claims, 6 Drawing Figures

FLOW RATE DETECTION DEVICE

BACKGROUND OF THE INVENTION

This invention relates to a flow rate detection device for measuring a flow rate of a dielectric fluid.

As a flow meter for detecting a flow rate of a dielectric fluid such as a fuel or the like, a vane type flow meter such as that shown in FIG. 1 is used. That is, in FIG. 1 (1) is a flow path of a fluid, (2) a vane wheel, and (3) is a container for accommodating that vane wheel therein. When the fluid flowing through the flow path (1) strikes against the vane wheel (2), the vane wheel (2) is rotated at a speed identical to a flow speed of the fluid. Assuming that the flow speed of the fluid is designated by V in m/sec, the number N, in r/sec of rotation per unit time, (which is simply called hereinafter a rotational speed), of the vane wheel (2) is given by the following expression:

$$N = K_n V \tag{1}$$

On the other hand, assuming that a flow rate of the fluid is designated by $Q_v$ in m³/sec and a sectional area of the flow path (1) is designated by S in m³, the flow speed V in m/sec of the fluid is given by the following expression:

$$V = (Q_v/S) \tag{2}$$

From the expressions (1) and (2) the relationship between the flow rate $Q_v$ in m³/sec of the fluid and the rotational speed N in r/sec of the vane wheel (2) is given by the following expression:

$$N = K_n(Q_v/S) \tag{3}$$

Since both the sectional area S in m² of the flow path (1) and $K_n$ in the expression (2) are constants, the rotational speed N in r/sec of the vane wheel (2) is proportional to the flow rate $Q_v$ in m³/sec of the fluid. Therefore, if the rotational speed N in r/sec is measured, the flow rate of the fluid flowing through the flow path (1) can be measured.

Since conventional vane flow meters measure the rotational speed N in r/sec of the vane wheel (2) as described above, the flow rate of fluid can be accurately measured as shown in the expression (3) provided that a flow of the fluid flowing through the flow path (1) is in the steady state (the flow rate $Q_v$ in m³/sec being substantially constant). However, where the flow rate of the fluid has suddenly changed (suddenly increased or suddenly decreased), there is a time delay until the vane wheel (2) has a speed identical to the flow speed v in m/sec of the fluid because the vane wheel (2) has an inertia. The inertia of the vane wheel (2) can be reduced by properly selecting the shape and material of the vane wheel (2) and devising it so as to be small-sized and light-weight. However, since the strength of the structure can not be disregarded, a reduction in inertia of the vane wheel (2) has a limit. Accordingly, in the case where the flow of the fluid is suddenly varied with respect to time, for example, in the case of an intermittent stream, it is possible to comparatively accurately measure the mean flow rate but it is impossible to accurately measure an instantaneous flow rate because a time delay occurs until the vane wheel (2) speed coincides with the flow speed of the fluid as described above.

SUMMARY OF THE INVENTION

According to the present invention, a mass flow rate of a dielectric fluid is measured by coaxially disposing electrodes for forming an electric field having an intensity spatially changed along a flow of the dielectric fluid and measuring the dielectric polarization current flowing when the dielectric fluid flows through this electric field. Thus, there is the effect that even a flow rate having a large change, for example, a flow rate of an intermittent stream can be detected with a good response.

DESCRIPTION OF THE PREFERRED EMBODIMENTS

Figure 1:
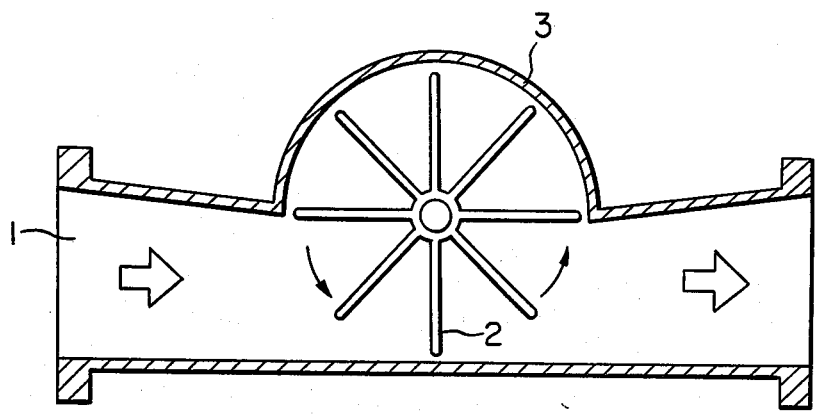
FIG. 1 is a side elevational sectional view of a conventional flow meter for a dielectric fluid.
Figure 2:
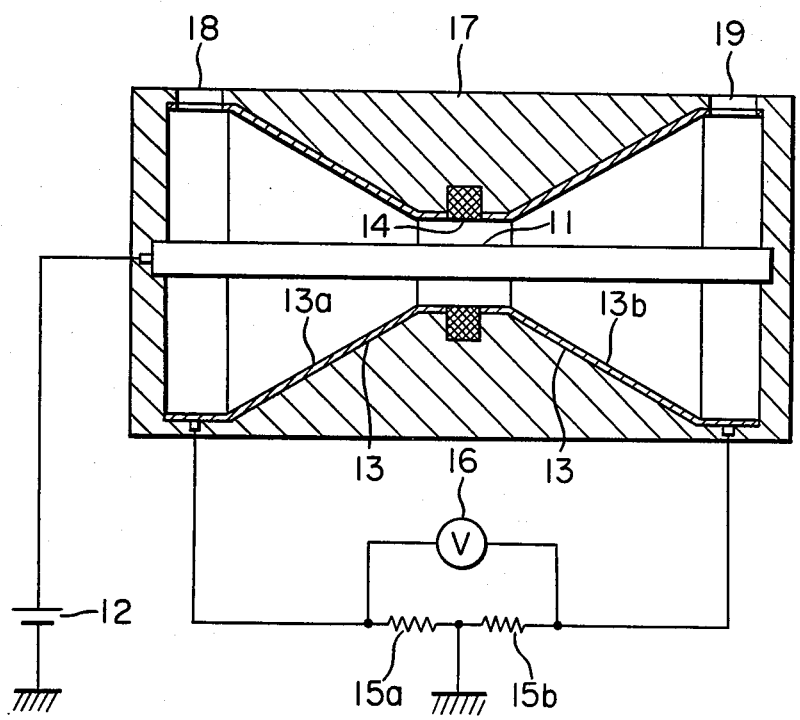
FIG. 2 is a side elevational sectional view illustrating one embodiment of the present invention.

FIG. 2 shows one embodiment of the present invention wherein (11) is a central electrode disposed in a path of a dielectric fluid and connected to a positive pole of a high voltage DC electric source (12). (13) is a cylindrical circumferential electrode disposed around the outer periphery of the central electrode (11) to oppose each other through a fluid flowing space, and consisting of two circumferential electrodes (13a) and (13b) divided in a direction of flow of the fluid. (14) is an insulating member for insulating those circumferential electrodes (13a) and (13b) from each other, (15a) and (15b) are current detecting resistances serially connected between said circumferential electrodes (13a) and (13b), (16) a voltmeter, and (17) is a housing supporting each of said electrodes (11) and (13) and comprised of an insulating member (18) and (19) are an inflow port and an outflow port for the dielectric fluid connected to a flow path of the fluid (not shown). The middle point of said resistances (15a) and (15b) is connected to ground and a voltage across said electric source (12) is applied between said electrodes (11) and (13). Also, said electrodes (11) and (13a) and (13b) are constructed so that sections perpendicular to the stream of the fluid are circular-shaped.

The following description will be made in conjunction with the operation of FIG. 2 constructed in this way. Applied between the central electrode (11) and the circumferential electrodes (13a) and (13b) connected to ground through the detecting resistances (15a) and (15b) respectively is a voltage which is supplied by the electric source (12) and an electric field is formed in the path of the fluid surrounded by the central electrode (11) and the circumferential electrodes (13a) and (13b). The shapes of those central electrode (11) and circumferential electrodes (13a) and (13b) are formed so that by considering that a distribution of electric fields on the side of the inflow port (18) for the fluid is rendered symmetric with respect to that on the side of the outflow port (19) therefor about the insulating member (14), the electric field intensity is strongest adjacent to the insulating member (14) and weakest adjacent to the inflow port (18) and outflow port (19) for the fluid with the electric field intensity therebetween spatially slowly changed. Assuming that E(z) designates an electric field intensity formed at each part in the path of the fluid, $K_e$ designates a specific dielectric constant and $\epsilon_0$ designates a dielectric constant of a vacuum, a dielectric polarization intensity P at each part in the path of the fluid is given by the following expression:

$$P=\epsilon_0(K_e-1)E(z) \qquad (4)$$

Figure 3:
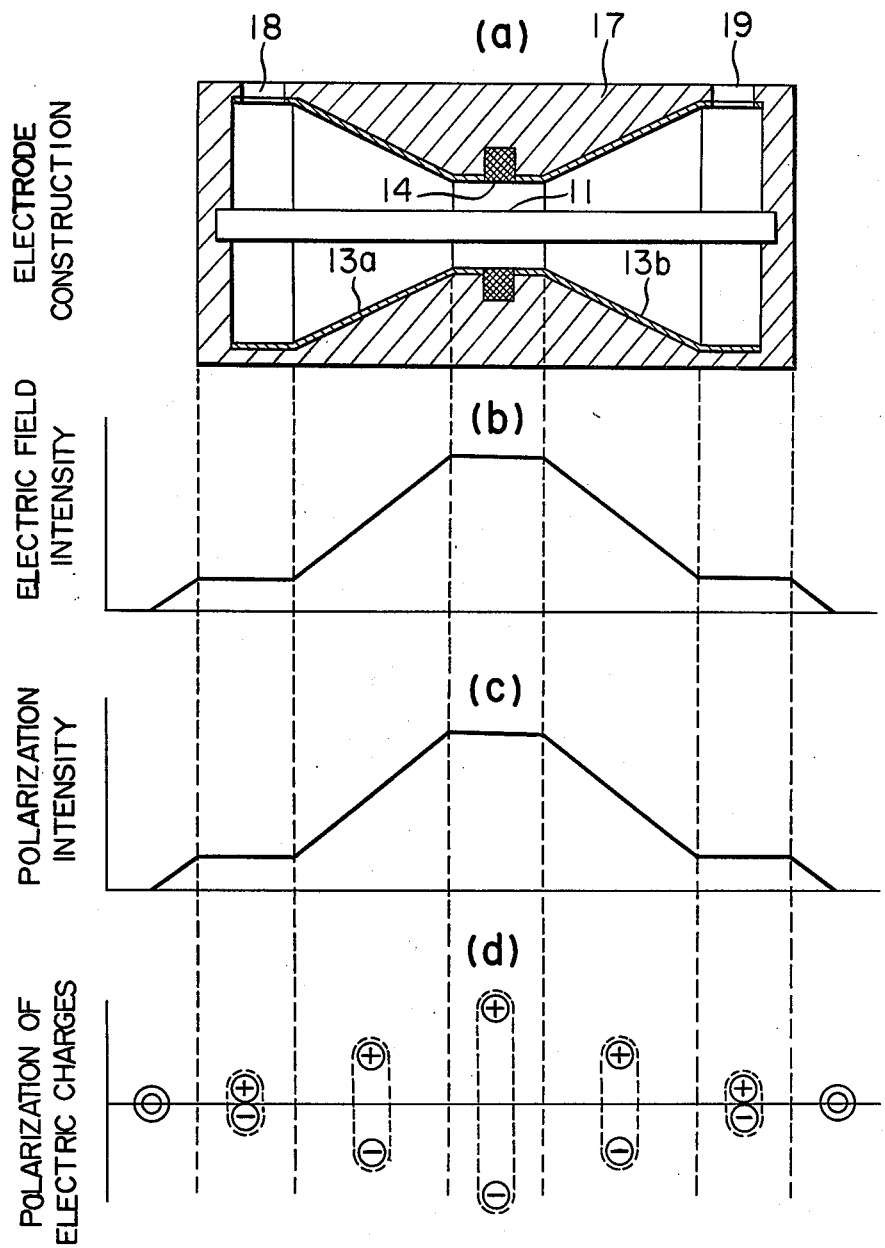
FIGS. 3, 4 and 5 are views explaining the operation of the present invention.

In FIG. 3 there are illustrated the shapes and dispositions of the central electrode (11) and the circumferential electrodes (13a) and (13b), the electric field intensity E at each part in the path of the fluid and the dielectric polarization intensity P of the dielectric. That is, FIG. 3(a) shows the shapes and disposition of the central electrode (11) and the circumferential electrodes (13a) and (13b). Interelectrode distances between the central electrode (11) and the circumferential electrodes (13a) and (13b) are rendered largest adjacent to the inflow port (18) and the outflow port (19) for the fluid and smallest adjacent to the insulating member (14) on the central part while the interelectrode distances therebetween are rendered linearly changed. FIG. 3(b) corresponds to the shapes and disposition of the electrodes shown in FIG. 3(a) and qualitatively illustrates a distribution of the electric field intensities at each part. The electric field intensity within the path of the fluid is weakest adjacent to the inflow port (18) and the outflow port (19) for the fluid and strongest adjacent to the insulating member (14) on the central part with the electric field intensity therebetween slowly changed. FIG. 3(c) corresponds to the distribution of the electric field intensities shown in FIG. 3(b) and illustrates a distribution of dielectric polarization intensities at each part. Since the specific dielectric constant of the dielectric is a constant, the dielectric polarization intensity is proportional to the electric field intensity as shown by the expression (4). Accordingly, the distribution of the dielectric polarization intensities becomes identical to that of the electric field intensities. FIG. 3(d) illustrates the distribution of the dielectric polarization intensities shown in FIG. 3(c) by modelling that distribution with the polarization of positive and negative charges composing dielectric molecules. Before the dielectric fluid enters the region of the electric field, the dielectric molecules are neutral but when the dielectric fluid enters the region of the electric field, the polarization of the positive and negative charges becomes strong in proportion to the electric field intensity and the polarization becomes strongest adjacent to the insulating member (14) on the central part. When the central part is passed by and the electric field intensity becomes weak, the polarization of the positive and negative charges becomes weak. When leaving the region of the electric field, the dielectric becomes again neutral.

Figure 4:
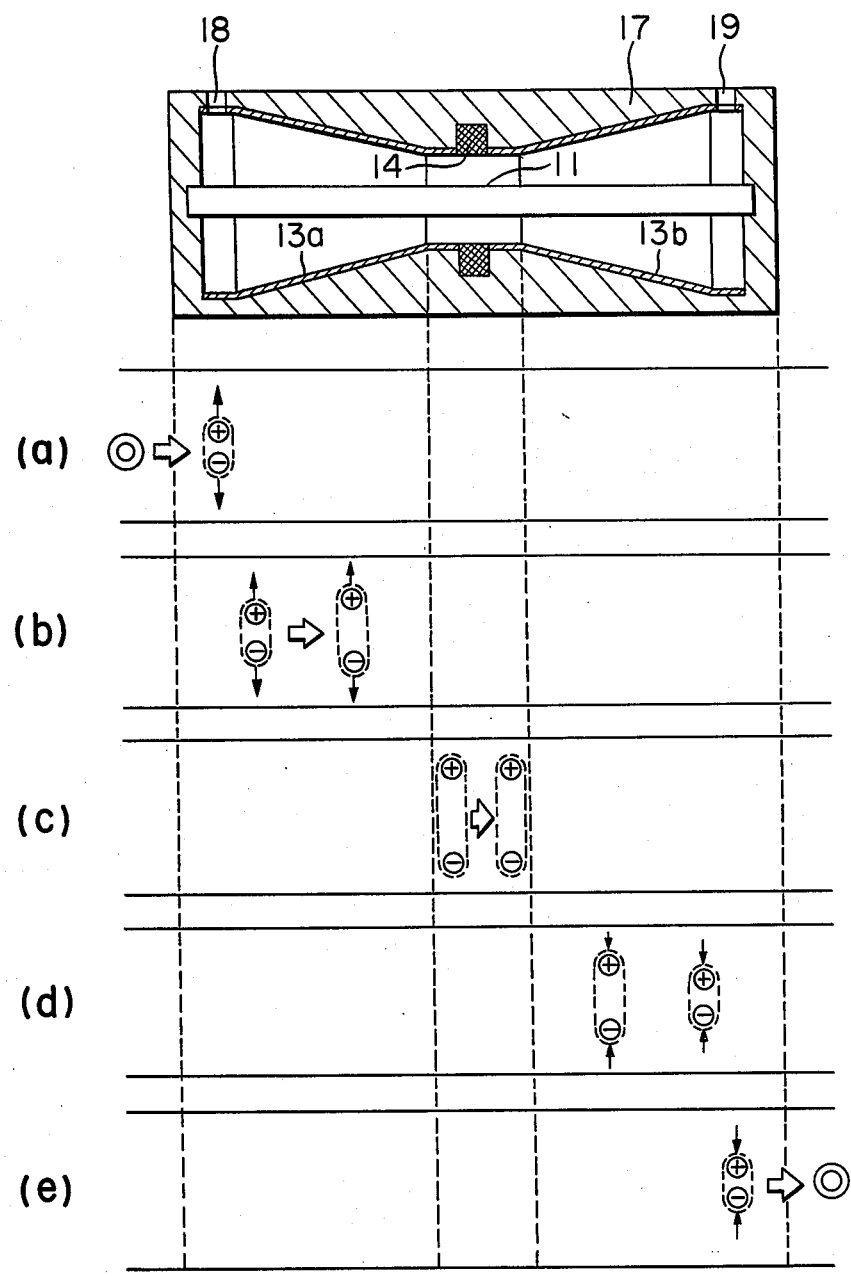

FIG. 3 shows the distribution of the polarization intensities of the dielectric fluid which is the same in spite of whether the dielectric fluid is moving or stationary. However, perceiving the individual molecules, the polarization intensities of the individual molecules are constant with the dielectric fluid put in the stationary state whereas the polarization intensities of the individual molecules change upon the flowing of the dielectric fluid because of changes in polarization intensities acting upon the individual melecules. In FIG. 4 there is illustrated a situation in which the polarization intensity changes with the flowing dielectric fluid by a model for the polarization of positive and negative charges of the molecule with the individual molecules perceived.

FIG. 4(a) illustrates the situation of the molecule of the dielectric fluid before it enters the region of the electric field. In this region, no electric field exists in the path so that the positive and negative charges of the molecule are not polarized and the molecule is neutral. FIG. 4(b) illustrates the situation of the molecule of the dielectric fluid in which it has entered the region of the electric field through the inflow port (18). In this region the electric field acting on the molecule becomes strong upon the molecule flowing to the side of the outflow port (19). Thus, the positive and negative charges of the molecule are moved in the direction of the arrow (→) in the Figure to advance the polarization. In other words, when the dielectric fluid flows to the side of the outflow port (19), a dielectric polarization current flows through between the central electrode (11) and the circumferential electrode (13a). FIG. 4(c) illustrates the situation of the molecule of the dielectric field in which it has moved adjacent to the insulating member (14) on the central part. In this region, the electric field intensity is strongest so that the polarization intensity of the melecule is strongest but the electric field intensity acting on the molecule of the dielectric fluid does not change even when the molecule flows to the side of the outflow port (19). Thus, the polarization intensity of the molecule does not change and the dielectric polarization current does not flow. FIG. 4(d) illustrates the situation of the molecule of the dielectric fluid in which it has further flowed to the side of the outflow port (19). In contradistinction to the region shown in FIG. 4(b), when the molecule of the dielectric fluid flows to the side of the outflow port (19) in this region, the electric field intensity acting on the molecule becomes weak so that the positive and negative charges of the molecule are moved in the direction of the arrow (→) in the Figure to return the polarization. In other words, when the dielectric fluid flows to the side of the outflow port (19), a dielectric polarization current flows in a sense which is reversed from that illustrated in the region shown in FIG. 4(b), that is to say, a negative current flows between the central electrode (11) and the circumferential electrode (13b). FIG. 4(e) shows the situation of the dielectric fluid in which it has moved outside of the region of the electric field through the outflow port (19). In this region, no electric field exists so that the polarization of the positive and negative charges of the dielectric disappears and the dielectric fluid becomes neutral.

Figure 5:
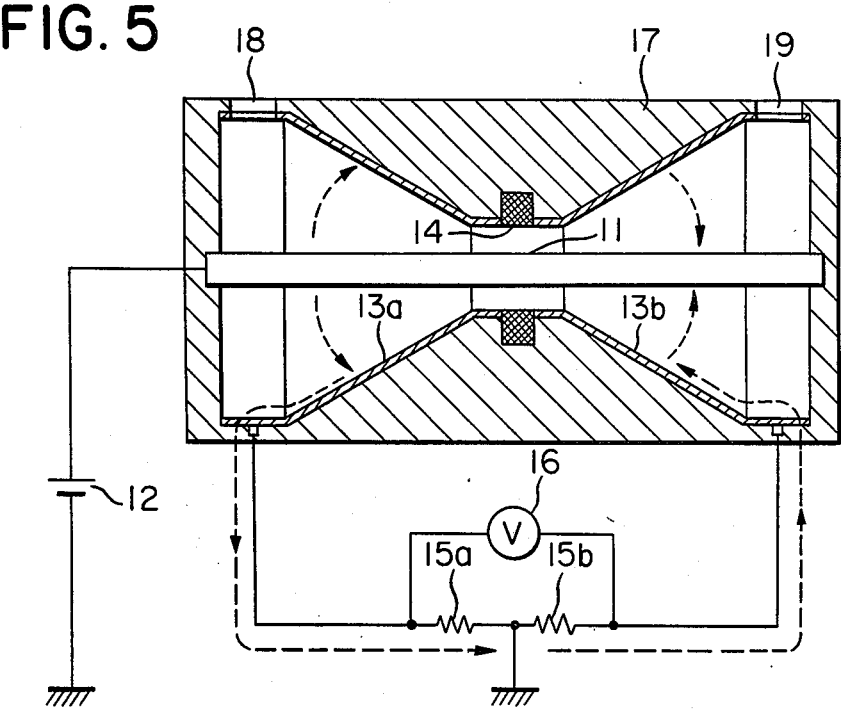

FIG. 5 shows the case in which the dielectric polarization current flows between the central electrode (11) and the circumferential electrodes (13a) and (13b) during the process in which the dielectric fluid enters the region of the electric field through the inflow port (18) for the fluid and flows through the region of the electric field until it flows out from the outflow port (19). In a region in which the polarization intensity is increased, the dielectric polarization current from the central electrode (11) flowing into the circumferential electrode (13a) passes through the current detecting resistances (15a) and (15b) and enters the circumferential electrode (13b) while in a region in which the polarization intensity is decreased, it enters the central electrode (11) through the circumferential electrode (13b) as a negative dielectric polarization current. At that time, if the voltmeter (16) measures a voltage developed across the current detecting resistances (15a) and (15b), then this permits the measurement of a dielectric polarization current flowing when the dielectric fluid flows through the electric field whose intensity spatially varies along the flow of the dielectric fluid.

Furthermore, when the dielectric fluid flow changes in sense, then the dielectric polarization current also changes in sense. Thus, the sense of the flow can be determined.

This dielectric polarization current $I_p$ is determined by the voltage V applied between the central electrode (11) and the circumferential electrodes (13a) and 13(b), a radius of an internal electrode [the voltage applied circumferential electrode (11)], a radius $r_0$ of an outer electrode [the circumferential electrode (13)] and a volume flow rate $G_v$ of the dielectric fluid and the current is given by the following expression:

$$I_p = \frac{2\epsilon_0 (K_e - 1) V}{(r_0^2 - r_i^2) \ln \frac{r_0}{r_i}} G_v \qquad (5)$$

In the expression (5), a specific polarizability ($K_e - 1$) of the dielectric is proportional to a density $\rho$ of the dielectric and is given by the following expression:

$$[K_e - 1] = K_p \rho \qquad (6)$$

Accordingly, assuming that $G_m$ designates a mass flow rate of the dielectric fluid, the dielectric polarization current $I_p$ is given by the following expression:

$$I_p = \frac{2\epsilon_0 K_p V}{(r_0^2 - r_i^2) \ln \frac{r_0}{r_i}} G_m \qquad (7)$$

In the expressions (6) and (7) $K_p$ is a constant inherent to the dielectric, and $r_i$ and $r_0$ are constants which are determinated by the size and shape of the voltage V applied between the electrode (11) and the current detecting electrode (13). Thus, assuming that the voltage V applied between the voltage applied electrode (11) and the current detecting electrode (13) is constant, the dielectric polarization current $I_p$ becomes proportional to the mass flow rate $G_m$ of the dielectric fluid. That is, the flow meter according to the present invention is a mass flow meter for a dielectric fluid.

Figure 6:
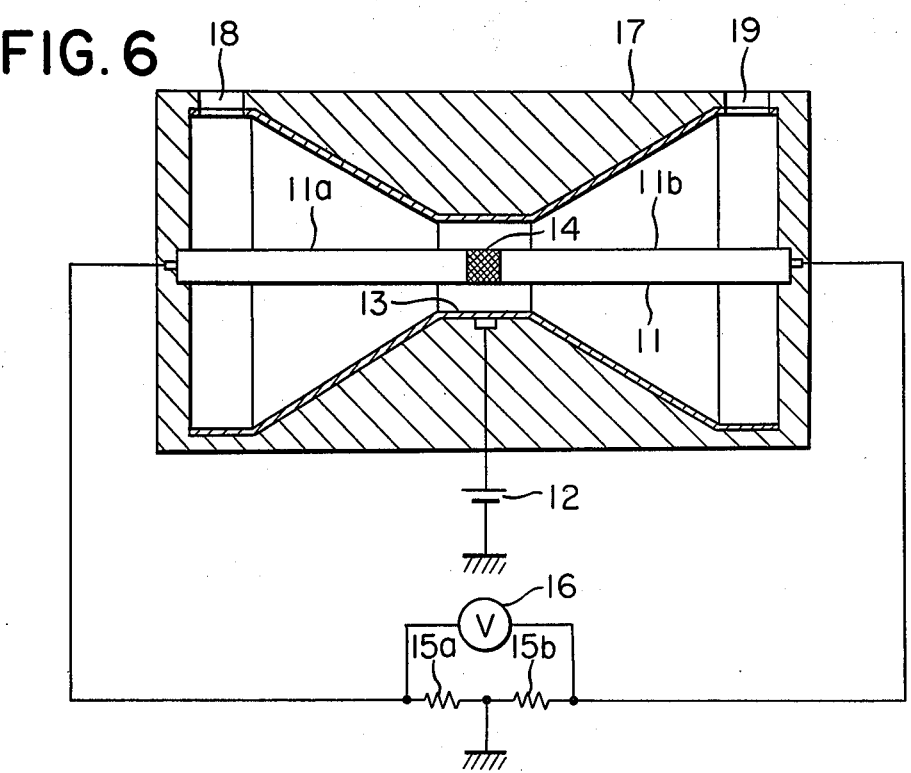
FIG. 6 is a side elevational sectional view illustrating another embodiment of the present invention.

FIG. 6 shows another embodiment of the present invention. In the embodiment shown in FIGS. 2 through 5, the electrodes are arranged coaxially and the circumferential electrode (13) is divided with the current detecting resistances (15a) and (15b) connected therebetween in order to form the electric field having an intensity spatially changed along the flow of the dielectric fluid but the effect of the present invention is not damaged even by dividing the central electrode (11), coupling two electrodes (11a) and (11b) to each other through the insulating member (14) and connecting the current detecting resistances (15a) and (15b) between those electrodes (11a) and (11b) as in another embodiment shown in FIG. 6.

Furthermore, the generation and neutralization of the polarization can be caused on the dielectric fluid through the utilization of a change in electric field intensity developed in the vicinity of either end of a direction of a flow of the fluid flowing between a pair of equidistant coaxial electrodes without obtaining a change in electric field due to a variation in distance between the respective electrodes (11) and (13).

As described above, and according to the present invention, the electrodes for forming the electric field having an intensity changed spatially along the flow of the dielectric fluid are arranged coaxially and the dielectric polarization current flowing when the dielectric fluid flows through this electric field is measured so as to thereby measure the mass flow rate of the dielectric fluid resulting in the following effects:

(i) Since movable mechanical portions are not included, structurally and temporarily delaying elements due to inertias do not exist, and the response is fast and not only the mean flow rate of the dielectric fluid but also an instantaneous flow rate of an intermittent flow can be faithfully measured with a good accuracy.

(ii) Since the dielectric polarization current is inverted in sense in accordance with a direction of flow of the dielectric fluid, the sense of flow of the dielectric fluid can be determined in accordance with the polarity of the dielectric polarization current.

(iii) Since the electric field formed in the path of the dielectric fluid is formed of a pair of electrodes put in a coaxial arrangement, the axis or symmetry can be made about the axis of the central electrode and a disturbance of the electric field attributing to the shape and disposition of the electrodes does not exist adjacent to a maximum of the electric field intensity. Thus, it becomes possible to effect the stable measurement with a high accuracy.

(iv) The path of the dielectric fluid is surrounded by the circumferential electrode and no disturbance of the electric field due to the intrusion of an external electric field exists adjacent to a maximum of the electric field intensity. Thus, it becomes possible to effect the stable measurement with a high accuracy.

(v) Since the path of the dielectric fluid can be render circular, there is provided a flow meter for dielectric fluids which is small-sized and small in its pressure loss.

(vi) Since the structure is simple and includes no movable portion, there is provided a flow rate detection device which is inexpensive and high in reliability.

INDUSTRIAL APPLICABILITY

The present invention is not restricted to a flow meter for detecting a flow rate of a fuel and so far as the flow rate of dielectric fluids in concerned, it is similarly applicable to devices for measuring it.

I claim:

1. A flow meter comprising an electric field forming means disposed in a flow path of a dielectric fluid and having a central electrode and a circumferential electrode radially opposing to an outer periphery of said central electrode so as to form an electric field in the flow path of said dielectric fluid, said electrodes arranged such that said electric field has its intenstiy changed along said fluid flow path by applying a voltage between said individual electrodes, and further comprising a current detecting means operatively connected to said electrodes for detecting a dielectric polarization current flowing when said dielectric fluid flows through the interior of said electric field forming means;

wherein said central electrode comprises a rod shaped structure having its axis arranged along said fluid flow path and said circumferential electrode comprises a cylindrical structure whose diameter first decreases and then increases in a direction along its axis, said axis of said circumferential electrode being along said fluid flow path.

2. A flow meter as in claim 1, further comprising a voltage source having first and second terminals; and wherein said circumferential electrode comprises first and second portions which are insulated from each other and wherein said current detecting means comprises:

a pair of series connected current sensing resistors, each having one end respectively connected to said first and second portions of said circumferential electrode and having their other ends connected to said first terminal of said voltage source, said second terminal of said voltage source being connected to said central electrode;

a voltmeter connected across said series connected resistors;

wherein a voltage magnitude measured by said voltmeter corresponds to a flow rate of said dielectric fluid and a polarity of a voltage measured by said voltmeter corresponds to a direction of flow of said dielectric fluid.

3. A flow meter as in claim 1, further comprising a voltage source having first and second terminals; and wherein said central electrode comprises first and second portions which are insulated from each other and wherein said current detecting means comprises:

a pair of series connected current sensing resistors, each having one end respectively connected to said first and second portions of said central electrode and having their other ends connected to said first terminal of said voltage source, said second terminal of said voltage source being connected to said circumferential electrode;

a voltmeter connected across said series connected resistors;

wherein a voltage magnitude measured by said voltmeter corresponds to a flow rate of said dielectric fluid and a polarity of a voltage measured by said voltmeter corresponds to a direction of flow of said dielectric fluid.

* * * * *